Oct. 9, 1928.
J. H. SMITH
TWIST METER
Filed June 30, 1926
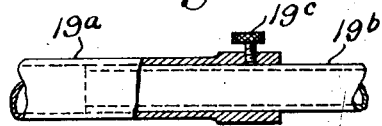
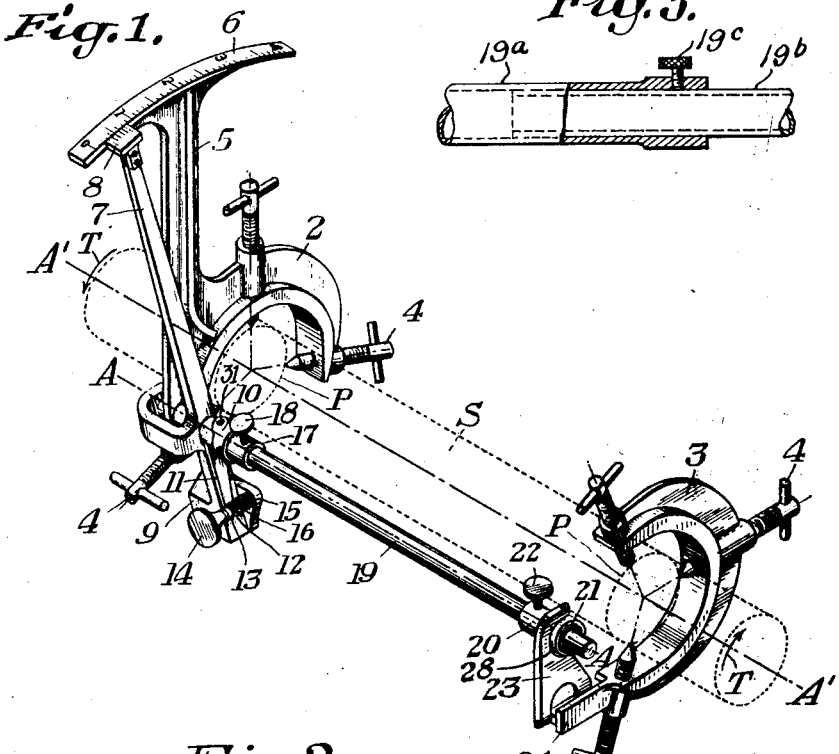
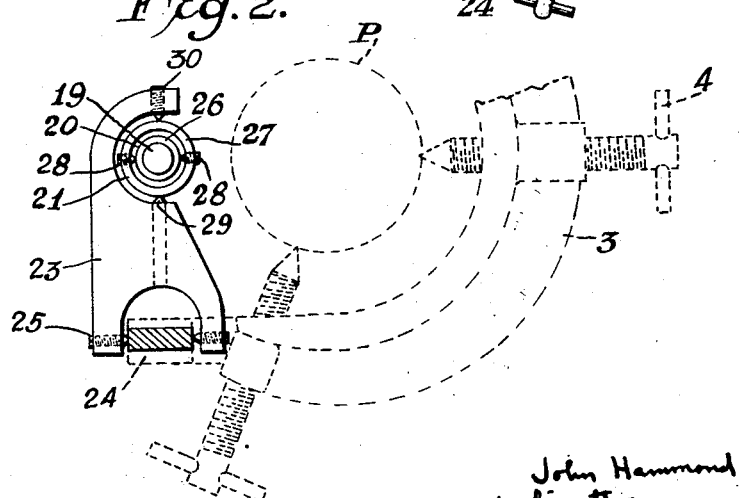
INVENTOR.
John Hammond Smith Patented Oct. 9, 1928.

1,686,714

UNITED STATES PATENT OFFICE.

JOHN HAMMOND SMITH, OF PITTSBURGH, PENNSYLVANIA.

TWIST METER.

Application filed June 30, 1926. Serial No. 119,661.

This invention relates to twist meters and provides a relatively simple instrument by which accurate twist readings in torsion tests may be quickly and conveniently secured.

In making torsion tests on shafting and the like, it is highly desirable to provide an instrument which may be quickly attached to the test piece or removed therefrom. I provide a twist meter comprising a pair of spaced yokes adapted to be secured to a piece to be tested, a member connecting the yokes and indicating means connected to this member. Preferably the yokes are made with pointed screws for engaging the test piece, and the connecting member comprises a shaft lying alongside such test piece and connected to the yokes through universal joints. With this arrangement, bending of the specimen does not affect the reading and inaccuracies in the centering of the yokes on the test piece likewise have no effect.

The relative rotation of the two planes of the specimen at which the yokes of the device are set in a true measure of the twist desired. This measure is secured by comparison of the relative movements of a divided arc carried on one of the yokes and a complementary pointer or vernier mounted on the same yoke but moved with the other yoke through the connecting shaft. Preferably, the shaft is made with telescoping portions to facilitate attachment of the instrument to the test piece, and also to permit of varying the spacing between the yokes.

In the accompanying drawings, which illustrate the present preferred embodiment of my invention, Figure 1 is a perspective view of the material applied to a test specimen, Figure 2 is a view to enlarged scale taken transverse to the test specimen, and showing one of the universal joints in more detail. In this view a small portion of one of the yokes is shown in section, the remaining portion of the yoke being indicated in dotted lines.

Figure 3 is a view partly broken away showing a telescopic shaft for connecting the yokes.

In the illustrated embodiment of the invention there is indicated by dotted lines a test specimen S to which the twist meter is secured. The meter comprises a pair of yokes 2 and 3, each provided with three pointed screws 4 by which the yokes may be attached to the specimen S in spaced-apart planes P.

The yoke 2 is provided with an extension 5 having a divided arc 6 thereon. An arm 7 is pivotally mounted on the yoke 2 and is provided with a vernier 8 cooperating with the arc 6. The arm 7 has a counterbalance 9 to insure accuracy. For convenience the arc and vernier should be divided into decimal parts of a circle instead of degrees. The arm 7 is pivoted to the yoke on an axis A—A substantially parallel with the axis A'—A' of the specimen.

A universal coupling 10 is mounted for rotation on the yoke 2 about the axis A—A, but is made movable independently of the pointer 7. The coupling 10 is provided with a downwardly extending arm 11 having a portion 12 which cooperates with the collar 13 of a thumb screw 14. The thumb screw 14 is threaded into a wing 15 integral with the counterbalance 9 of the pointer 7, and a spring 16 is provided around the screw 14 so as to always urge the portion 12 away from the wing 15. With this arrangement the position of the pointer 7 relative to the universal coupling 10 may be changed as desired.

The universal coupling 10 is provided with a sleeve portion 17 having a thumb screw 18. The sleeve portion 17 is adapted to receive one end of a shaft 19 which may be secured therein by the thumb screw 18.

The shaft 19 may be made in one piece or it may be made with telescoping portions to provide a wider range of adjustment. Figure 3 shows the shaft made in two telescoping portions 19$^a$ and 19$^b$, and provided with a thumb screw 19$^c$. The end of the shaft which is adjacent the yoke 3 fits into a sleeve 20 forming part of a universal coupling 21, and is held therein by a thumb screw 22. The universal coupling 21 is connected to the yoke 3 by a link 23 which is pivotally secured to an extension 24 on the yoke, as shown.

The link 23 swings downwardly to permit of attaching the yoke 3 to the specimen. The yokes are clamped in the positions shown by the thumb screws 4, after which the thumb screws 18 and 22 are tightened to operatively connect the yoke 3 with the arm 7. The thumb screw 14 is then adjusted to set the vernier at zero and the specimen is ready for the test. The direction of twisting of the shaft is indicated by arrows T.

The link 23 not only permits of free action of the apparatus regardless of the relative twisting of the two yokes, but also materially reduces the friction in the parts.

The link 23 is pivotally connected to the extension 24 on the yoke 3 by means of pointed screws 25.

Each of the universal couplings 10 and 21 is composed of an inner sleeve 26 and an outer sleeve 27. The inner sleeve 26 fits closely around the shaft 19 and is held in position by the set screw 22. The sleeve 26 has a rocking motion inside the sleeve 27 by reason of a pivot connection. This pivot connection is secured by pointed screws 28 which are threaded through the sleeve 27 and engage depressions in the sleeve 26. The outer sleeve 27 is connected to the mechanism carried by either yoke. In the case of the yoke 3 the sleeve 27 is pivotally connected to the link 23 by means of a pivot point 29 and a pivot screw 30, these last-mentioned parts being arranged at substantially right angles to the pointed screws 28. The outer sleeve of the universal coupling 10 is secured to the shaft of the pointer 7 by pivot screws 31.

As the specimen is twisted, the vernier 8 moves along the divided arc 6 and gives accurate readings of the relative rotation of the two planes P. The readings are unaffected by bending of the specimen, and in practice it is found that very satisfactory results are secured.

I have illustrated a preferred embodiment of the invention, but it will be understood that it is not limited to the form shown as it may be otherwise embodied within the scope of the following claims.

I claim:

1. A twist meter comprising a pair of spaced yokes adapted to be secured to a test specimen, a member extending between and supported by the yokes in such manner that the member moves relative to one yoke when the yokes are moved relative to each other, and indicating means connected to the member.

2. A twist meter comprising a pair of spaced yokes adapted to be secured to a test specimen, a torsion member extending between and supported by the yokes in such manner that the member moves relative to one yoke when the yokes are moved relative to each other, and indicating means connected to the torsion member.

3. A twist meter comprising a pair of spaced yokes adapted to be secured to a test specimen, a shaft, universal joints connecting the shaft to the yokes in such manner that the shaft rotates relative to one yoke when the yokes are rotated relative to one another, and indicating means connected to the shaft.

4. A twist meter comprising a pair of spaced yokes adapted to be secured to a test specimen, a shaft lying generally parallel to the axis of the test specimen and connected to the yokes in such manner that the shaft rotates relative to one yoke when the yokes are rotated relative to one another, and indicating means connected to the shaft.

5. A twist meter comprising a pair of spaced yokes adapted to be secured to a test specimen, a scale on one yoke, a pointer cooperating therewith, and a shaft connecting the pointer to the other yoke.

6. A twist meter comprising a pair of spaced yokes adapted to be secured to a test specimen, a scale on one yoke, a pointer pivotally mounted on the yoke and cooperating with the scale, and a shaft connecting the pointer with the other yoke.

7. A twist meter comprising a pair of spaced yokes adapted to be secured to a test specimen, a scale on one yoke, a pointer pivotally mounted on such yoke, a shaft extending between the yokes and adapted to operate the pointer upon relative displacement of the yokes, and universal couplings for connecting the shaft with the yokes.

8. A twist meter comprising a pair of spaced yokes adapted to be secured to a test specimen, indicating means connected to one yoke, a universal joint mounted on the indicating means, and a shaft extending from the universal joint to the other yoke.

9. A twist meter comprising a pair of spaced yokes adaped to be secured to a test specimen, indicating means mounted on one of the yokes, a shaft connecting the yokes and adapted to actuate the indicating means upon relative turning movement of the yokes, and adjusting means whereby the yokes may be placed different distances apart.

10. A twist meter comprising a pair of spaced yokes adapted to be secured to a test specimen, means connecting the yokes and adapted for movement relative to the yokes when the yokes are moved relative to one another, indicating means connected to said member and operable upon relative turning movement of the yokes, a scale for the indicating means, and means for relatively shifting the scale and the indicating means so as to secure a zero setting.

11. A twist meter comprising a pair of spaced yokes adapted to be secured to a test specimen, said yokes being open-sided to facilitate attachment thereof to the specimen, a shaft extending between the yokes, indicating means connected to the shaft, and a link connecting the shaft with one of the yokes, said link normally lying across the open side of the yoke but being rotatable to permit of attaching the yoke to the specimen.

In testimony whereof I have hereunto set my hand.

J. HAMMOND SMITH.